United States Patent [19]

Clifford

[11] 4,187,278
[45] Feb. 5, 1980

[54] POLYMERIZATION PROCESS

[75] Inventor: Michael L. Clifford, Welwyn, England

[73] Assignee: Imperial Chemical Industries Limited, London, England

[21] Appl. No.: 676,342

[22] Filed: Apr. 12, 1976

[30] Foreign Application Priority Data

Apr. 18, 1975 [GB] United Kingdom ............. 16064/75

[51] Int. Cl.² .......................... B01J 1/00; C08L 23/00
[52] U.S. Cl. ................................ 422/132; 422/134; 422/135; 526/65; 526/68
[58] Field of Search ................................ 23/260, 285; 260/878 B (U.S. only); 526/65, 66, 68, 901 (U.S. only); 422/131, 132, 134, 135

[56] References Cited

U.S. PATENT DOCUMENTS

| | | | |
|---|---|---|---|
| 3,035,040 | 5/1962 | Findlay | 526/68 X |
| 3,056,769 | 10/1962 | Reay et al. | 526/68 |
| 3,341,622 | 9/1967 | Leibson et al. | 260/878 B |
| 3,347,955 | 10/1967 | Renaudo | 260/878 B |
| 3,358,056 | 12/1967 | Renaudo | 260/878 |
| 3,454,675 | 7/1969 | Scoggin | 526/65 X |
| 3,514,501 | 5/1970 | Leibson et al. | 260/878 B |
| 3,622,553 | 11/1971 | Cines | 526/65 |
| 3,625,932 | 12/1971 | Green | 526/65 |

FOREIGN PATENT DOCUMENTS 1373620  11/1974  United Kingdom ............. 260/878

*Primary Examiner*—Joseph Scovronek
*Assistant Examiner*—Roger F. Phillips
*Attorney, Agent, or Firm*—Cushman, Darby & Cushman

[57] ABSTRACT

A polymerization process is carried out in at least two zones, wherein in one zone polymerization is effected in the presence of a liquid phase which is at least one liquid olefine monomer and in a subsequent zone polymerization is effected by contacting the solid polymer with a gaseous olefine monomer, the product from the first zone being subjected to a concentration stage to remove some of the liquid olefine monomer before the concentrated polymer mixture is passed to the subsequent zone for polymerization with the gaseous olefine monomer. The monomer in each case may be the same, for example liquid propylene in one zone and gaseous propylene in a subsequent zone. The concentration stage may be effected using a hydrocyclone.

5 Claims, 1 Drawing Figure

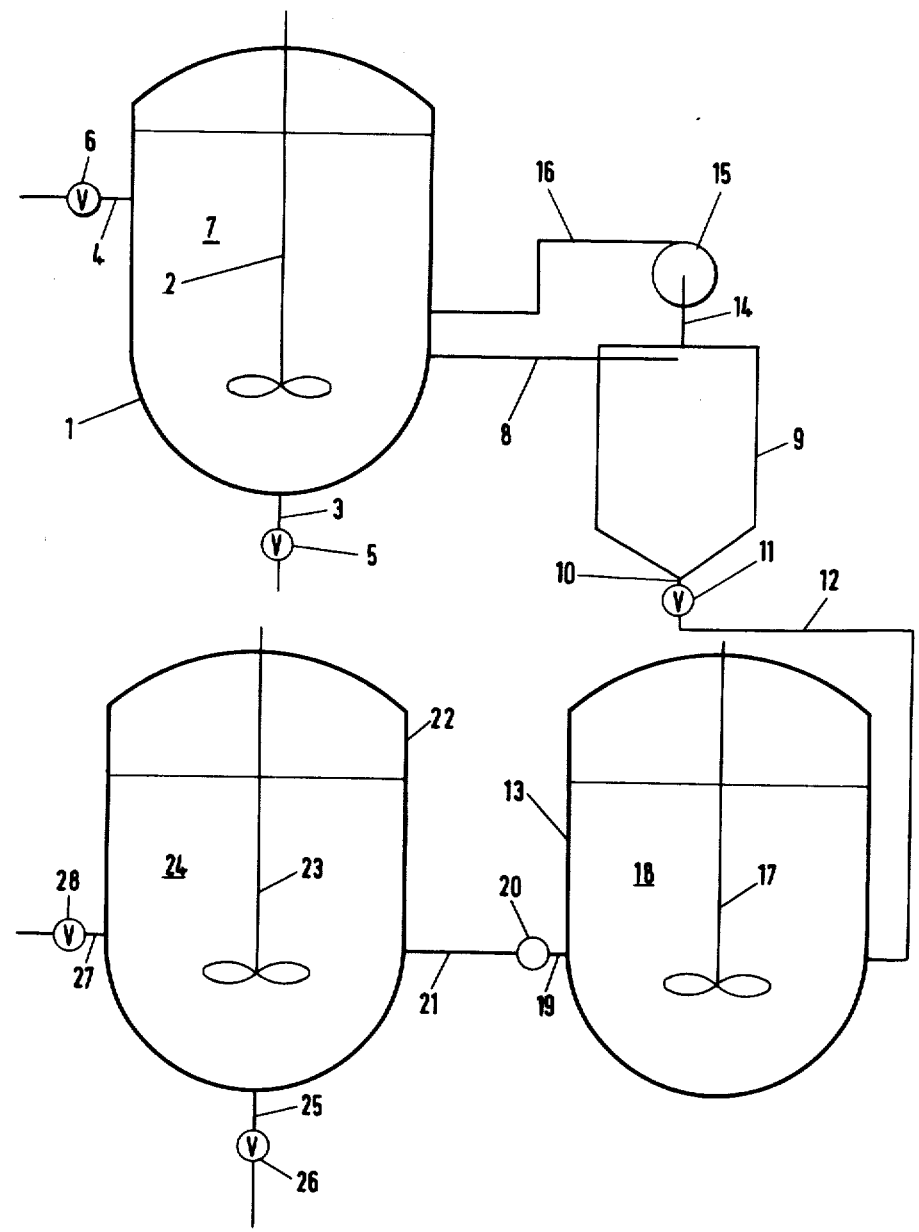

POLYMERIZATION PROCESS

The present invention relates to processes of producing olefine polymers in two or more stages.

According to the present invention there is provided a process for the production of an olefine polymer be effecting polymerisation in at least two stages wherein, in one stage, polymerisation is effected in a liquid medium which is at least one liquid olefine monomer which is being polymerised in the presence of an olefine polymerisation catalyst, a product mixture of a solid olefine polymer and a liquid olefine monomeric phase is removed from the liquid polymerisation stage, the liquid olefine monomeric phase is partially separated from the solid olefine polymer to give a concentrated mixture of solid olefine polymer and liquid olefine monomeric phase, which concentrated mixture has a higher content of solid olefine polymer than is in the mixture removed from the liquid polymerisation stage and the concentrated mixture is passed to a subsequent polymerisation stage in which polymerisation is effected in the substantial absence of a liquid phase by contacting at least one gaseous olefine monomer with the solid olefine polymer in the presence of the olefine polymerisation catalyst.

The concentrated mixture contains some of the liquid olefine monomeric phase and this concentrated mixture is passed to a polymerisation stage in which one or more olefine monomers are polymerised in the gaseous phase in the substantial absence of a liquid phase. The liquid olefine monomeric phase present in the concentrated mixture may be vaporized before it is introduced into the subsequent polymerisation stage, but it is preferred to introduce the concentrated mixture into the subsequent polymerisation stage and to cause the liquid olefine monomeric phase to vaporize in the subsequent polymerisation stage, the vaporization of the liquid monomer providing some cooling to the system.

The liquid olefine monomeric phase can be partially separated from the solid olefine polymer by any suitable technique and it is preferred to effect this partial separation by passing the mixture tangentially into a hydro-cyclone. Using a hydro-cyclone, the monomeric material separated can remain in the liquid phase and this can be recycled directly to the liquid olefine polymerisation stage. By using a hydro-cyclone, a partial classification of the solid particles suspended in the liquid olefine monomeric phase can be effected. Some of the solid particles are relatively small and these particles can contain olefine polymerisation catalyst which has effected only a small amount of polymerisation. The small particles tend to remain suspended in the liquid olefine monomeric phase and thus are recycled to the liquid olefine polymerisation stage. In this manner, the catalyst removed from the liquid olefine polymerisation stage has, in general, produced an appreciable quantity of olefine polymer. A hydro-cyclone contains no moving parts and can be operated at high pressure. Thus, the use of a hydro-cyclone provides a convenient method of obtaining a partial separation of the liquid olefine monomeric phase from the solid olefine polymer under high pressure conditions.

It will be appreciated that the process of the present invention is applicable to olefine monomers which are volatile liquids under the polymerisation conditions since some of the olefine monomer from the liquid olefine polymerisation stage is vaporized either before, or after, the concentrated mixture is introduced into the subsequent polymerisation stage. Any olefine monomers which are volatile liquids can be polymerised by the process of the present invention and suitable monomers which can be used as the liquid monomeric phase are propylene, butene-1 and 4-methylpentene-1. The olefine monomer, or monomers, polymerised in the subsequent stage may be the same as used in the liquid olefine polymerisation stage, but other gaseous olefine monomers may be used, for example ethylene. The present invention may be used to effect homopolymerisation of a liquid olefine monomer in one stage and to effect copolymerisation of the same olefine monomer, in the vaporized state, with ethylene in the subsequent stage.

Thus, in a particular embodiment of the present invention, liquid propylene is polymerised in one stage in the presence of an olefine polymerisation catalyst, a mixture of liquid propylene monomer and solid polypropylene is partially separated and the concentrated mixture of solid polypropylene and liquid propylene monomer is passed to a subsequent polymerisation stage in which the solid polypropylene is contacted with a gaseous mixture of ethylene and propylene in the presence of the olefine polymerisation catalyst.

Since the amount of the liquid olefine monomeric phase present in the concentrated mixture can be appreciable, particularly when the olefine monomer has been vaporized, it may be preferred to effect a copolymerisation process by contacting the solid olefine polymer with a gaseous olefine monomer, or monomers, in at least two stages.

Thus the concentrated mixture is passed to a stage in which the liquid olefine monomer is vaporized and the vaporized olefine monomer is polymerised, at least partially, and the mixture of solid olefine polymer and gaseous olefine monomer is passed to a further stage in which copolymerisation is effected by contacting the polymer with a different gaseous olefine monomer, or a mixture of gaseous olefine monomers. Using this procedure, all of the olefine monomer introduced into the stage in which the concentrated mixture is introduced can be introduced as the liquid olefine monomer present in the concentrated mixture, but if desired additional olefine monomer, which may be different from that in the concentrated mixture, can also be introduced. The olefine monomer, or monomers, introduced into the further stage, and any olefine monomer introduced in addition to the concentrated mixture, can be introduced either in the liquid phase, and then vaporized, or in the gaseous phase. Since an additional cooling effect is generally obtained if liquid monomers are introduced and then vaporized, it is generally preferred to add the olefine monomers in the liquid phase.

In order to effect polymerisation it is necessary that a polymerisation catalyst is present in a catalytically active form at each stage of the polymerisation. Depending on the nature of the polymerisation catalyst, it may be necessary to introduce a quantity of fresh catalyst to each stage in the polymerisation. However, in general, the catalysts can retain polymerisation activity for a sufficient time to effect polymerisation at all stages of the process, and are carried through the process with the solid olefine polymer as it is formed.

The polymerisation conditions in the various stages are dependent on the olefine monomer, or monomers, used and the nature of the catalyst. Typically the temperature is at least 40° C. and not more than 100° C., particularly at least 50° C. and not more than 80° C. The pressure will be such as to maintain the olefine monomer in the liquid phase and when the monomer is propylene will be at least 225 psi gauge at 40° C. and at least 630 psi gauge at 90° C., it being appreciated that the critical temperature of propylene is 91.9° C.

In the subsequent stage, in which polymerisation is effected in the presence of a gaseous olefine monomer, at least a part of the gaseous olefine monomer will be an olefine monomer as used in the liquid form in the liquid olefine polymerisation stage. In order to ensure that the olefine monomer as used in the liquid olefine polymerisation stage is in the gaseous form in the subsequent stage, it is necessary to ensure either that the temperature of the subsequent stage is higher than that of the liquid olefine polymerisation stage or, that the partial pressure of the olefine monomer as used in the subsequent polymerisation stage is less than the partial pressure of that monomer in the liquid polymerisation stage. Conveniently both stages are operated at essentially the same temperature, and the subsequent stage is operated at a lower pressure.

Thus, if propylene is being polymerised, the temperature in the subsequent stage is conveniently at least 40° C. and may be as high as 100° C., and the propylene partial pressure is correspondingly less than 220 psi gauge at 40° C. and less than 620 psi gauge at 90° C.

The total pressure in the subsequent stage is preferably less than the monomer partial pressure in the liquid polymerisation stage but, if copolymerisation is being effected, then the total pressure in the subsequent stage can be higher than the pressure in the liquid polymerisation stage, without any condensation of the monomers occurring in the subsequent stage.

The process of the present invention is conveniently effected using a chain transfer agent in one or more stages of the polymerisation, in order to control the molecular weight of the polymer obtained. A suitable chain transfer agent is hydrogen, and this is conveniently used in amounts of up to 10% molar relative to the olefine monomer, or monomers, the amount used being dependent on the nature of the desired polymer, the monomers used and the polymerisation conditions, particularly the temperature.

As a further aspect, the present invention also provides a polymerisation apparatus comprising a first polymerisation vessel, means for withdrawing a liquid phase comprising a solid olefine polymer and a liquid olefine monomeric phase from the first polymerisation vessel and for passing said liquid into a separation vessel, means for withdrawing, from the separation vessel, a concentrated mixture of solid olefine polymer and the liquid olefine monomeric phase, said concentrated mixture having an increased content of solid olefine polymer compared to the liquid phase introduced into the separation vessel, means for passing the concentrated mixture to a second polymerisation vessel and means for maintaining the second polymerisation vessel under conditions of temperature and pressure such that the olefine monomer forming the liquid olefine monomeric phase in the first polymerisation vessel, is in the gaseous phase.

The separation vessel is preferably a hydro-cyclone and the hydro-cyclone is provided with means for the tangential introduction of the liquid phase from the first polymerisation vessel.

The separation vessel is conveniently provided with a means for withdrawing a liquid phase, having a reduced content of solid olefine polymer, and returning this liquid phase directly to the first polymerisation vessel.

The means for withdrawing the concentrated mixture from the separation vessel may include a valve whereby the concentrated mixture can be withdrawn intermittently from the separation vessel. However, it is preferred to arrange the separation vessel to operate in a manner such that there is a continuous withdrawal of the concentrated mixture from the separation vessel.

The polymerisation apparatus can include a third polymerisation vessel, means for withdrawing a mixture of a solid olefine polymer and a gaseous olefine monomeric phase from the second polymerisation vessel and passing this mixture into the third polymerisation vessel and means for passing into the third polymerisation vessel at least one olefine monomer which is different from the monomer forming the liquid olefine monomeric phase withdrawn from the first polymerisation vessel.

If desired, the polymerisation apparatus may include more than three polymerisation vessels, any further polymerisation vessels being either subsequent to, but similar to, the third polymerisation vessel, or preceding, and similar to, the first polymerisation vessel. The terms "subsequent" and "preceding" are used herein with reference to the passage of solid olefine polymer through the polymerisation apparatus.

The second, third and subsequent polymerisation vessels should be suitable for effecting gas/solid reactions and can be fluidised bed reactor systems, stirred bed reactor systems or ribbon blender type reactor systems.

The first polymerisation vessel is provided with means for the introduction of a liquid olefine monomeric phase and for the introduction of a polymerisation catalyst. However, it will be appreciated that it may be found convenient to introduce at least one catalyst component with the liquid olefine monomeric phase. Thus, it may be convenient to provide at least two means for the introduction of the liquid olefine monomeric phase, each stream of the liquid olefine monomeric phase containing, dissolved or suspended in it, a different component of the polymerisation catalyst. If there is a vessel preceding the first polymerisation vessel, then a liquid phase containing solid olefine polymer and a liquid olefine monomeric phase will be introduced into the first polymerisation vessel from the preceding vessel. This liquid phase may contain sufficient of the polymerisation catalyst and it will be unnecessary to provide a separate means for introducing the polymerisation catalyst into the first polymerisation vessel.

Polymerisation is typically effected using a catalyst of the Ziegler type. Catalysts of this type are well-known and comprise a compound of a transition metal of Groups IVA to VIA of the Periodic Table together with an organo-compound of aluminium or of a non-transition metal of Groups IA to IIA of the Periodic Table. Using polymerisation catalysts such as the Ziegler catalysts which include at least two components, it is possible either to mix together the catalyst components and introduce the mixture into the polymerisation vessel, or to separately introduce the catalyst components into the polymerisation vessel. It will be appreciated that Ziegler catalysts may contain more than two components and may include Lewis Base compounds. Catalysts containing more than two components may be found to be particularly useful in the process of the present invention.

In order that the present invention is more readily understood, one embodiment thereof will now be described with reference to the accompanying drawing which is a flow diagram of a polymerisation apparatus containing three polymerisation vessels.

Referring to the diagram, a polymerisation vessel 1, having a stirrer 2, is provided with an inlet pipe 3 located at the base of the vessel 1 and an inlet pipe 4 located in the side wall of the vessel 1. The pipes 3 and 4 are provided with valves 5 and 6 respectively. The vessel 1 contains a reaction mixture 7 which consists of a solid olefine polymer and a liquid olefine monomer.

An outlet pipe 8 is located in the side wall of vessel 1, near the bottom thereof, and the pipe 8 forms a tangential inlet to a hydro-cyclone 9. An outlet pipe 10 at the bottom of the hydro-cyclone 9 is connected to a valve 11. From the valve 11 a connecting pipe 12 leads to a further polymerisation vessel 13.

The hydro-cyclone 9 is provided with a liquid outlet 14 which leads to a pump 15 from which a return pipe 16 leads to the vessel 1.

The polymerisation vessel 13 is provided with a stirrer 17 and contains a reaction mixture 18 which consists of a solid olefine polymer and a gaseous olefine monomer. The vessel 13 is also provided with an outlet pipe 19 which is connected to a valve 20. From the valve 20 a connecting pipe 21 leads to a further polymerisation vessel 22.

The vessel 22 is provided with a stirrer 23 and contains a reaction mixture 24 which consists of a solid olefine polymer and a gaseous olefine monomer. At the base of the vessel 22 is located an inlet pipe 25 which is provided with a valve 26. An outlet pipe 27, provided with a valve 28, is located near the bottom of the side wall of vessel 22.

The stirrers 17 and 23 are of a type which will thoroughly agitate a bed of solid particles, for example anchor-type stirrers.

The illustrated apparatus can be used to prepare a propylene copolymer as hereafter described.

Liquid propylene monomer is introduced into the vessel 1 through inlet pipe 3, with stirrer 2 being rotated. As least one catalyst component is introduced through the inlet pipe 4. The liquid propylene monomer introduced through the pipe 3 conveniently contains an organo-aluminium compound, for example diethyl aluminium chloride, and a suspension of titanium trichloride in heptane is introduced through the pipe 4, the titanium trichloride and the organo-aluminium compound together forming the polymerisation catalyst.

There is a continuous flow of liquid monomer, containing suspended solid, through the outlet pipe 8, into the hydro-cyclone 9, through outlet 14 and pump 15 and then along return pipe 16 back to the polymerisation vessel 1.

Within the hydro-cyclone 9, the large particles of solid polymer are concentrated and collect at the bottom of the hydro-cyclone 9, and are continuously withdrawn from the hydro-cyclone 9 at a controlled rate through outlet pipe 10, valve 11 and connecting pipe 12 and passed into the vessel 13.

Most of the small particles contained in the liquid monomer passing into the hydro-cyclone 9 are retained in the liquid propylene monomer and returned to the vessel 1. These small particles are predominantly catalyst particles on which no appreciable amount of polymerisation has occurred.

The liquid propylene monomer contained in the concentrated mixture passed into the vessel 13 vaporizes as it enters the vessel. The vaporized propylene is polymerised by the catalyst contained in the polymer particles.

From the vessel 13 there is a continuous controlled flow, of a mixture of solid polymer and gaseous propylene, through the outlet pipe 19, valve 20 and connecting pipe 21 to the vessel 22. Ethylene gas is introduced into the vessel 22 through the inlet pipe 25 and the ethylene and residual propylene are copolymerised onto the polymer particles. There is a continuous controlled flow of a polymer product, together with unpolymerised monomers, through outlet pipe 27 and valve 28.

The stirrers 17 and 23 are operated at a rate sufficient to provide an agitated bed of the solid polymer. The valves 11, 20, 26 and 28 are adjusted to maintain constant conditions within the vessels 1, 13 and 22 and, if desired, all of these valves, and the valve 5, are connected electrically to a control device (not shown) whereby the adjustment of the valves is continuously varied to control the conditions in the vessels 1, 13 and 22.

It will be appreciated that the vessels 1, 13 and 22 can be provided with outlets (not shown) for withdrawing gaseous monomer from the vessels, and these outlets may be connected to a recycle system (not shown) whereby the monomers are recycled in a known manner.

Using the apparatus illustrated to prepare a copolymer of propylene with ethylene, typical operating conditions are as follows:

| Vessel 1 | |
|---|---|
| Capacity | 10 M³ |
| pressure | 400 psig |
| Temperature | 65° C. |
| Average residence time | 2 hours |
| Hydrogen concentration in gas phase | 4% by volume |
| Propylene feed rate | 2000 kg/hour |
| Feed rate of TiCl₃ (of the type described in British Patent Specification 1,391,067) | 0.125 mM/liter reaction mixture |
| Feed rate of diethyl aluminium chloride feed rate | 0.625 mM/liter reaction mixture |
| Polymer concentration | 400 g/liter liquid propylene |
| Hydro-cyclone 9 | |
| Diameter | 30 cm |
| Length | 120 cm |
| Connecting pipe 12 | |
| Polymer concentration | 600 g/liter liquid propylene |
| Vessel 13 | |
| Capacity | 5 M³ |
| Pressure | 350 psig |
| Temperature | 70° C. |
| Average residence time | One hour |
| Connecting pipe 21 | |
| Polymer flow rate | 1650 kg/hour |
| Vessel 22 | |
| Capacity | 10 M³ |
| Pressure | 300 psig |
| Temperature | 70° C. |
| Average residence time | 2 hours |
| Ethylene feed rate | 130 kg/hour |
| Liquid Propylene feed rate | 200 kg/hour |
| Outlet pipe 27 | |

| -continued | |
|---|---|
| Polymer flow rate | 2150 kg/hour |

Other variations on the present invention will be apparent to the skilled worker and these may be effected without departing from the scope of the present invention as herein defined.

I claim:

1. A polymerisation apparatus comprising a first polymerisation vessel, a separation vessel, a second polymerisation vessel, outlet means in said first polymerisation vessel, inlet means in said separation vessel, connecting means from said outlet means to the inlet means of said separation vessel, the inlet means of said separation vessel being connected only to said connecting means whereby a liquid phase consisting essentially of a solid olefine polymer and a liquid olefine monomeric phase is withdrawn from the first polymerisation vessel and this liquid phase is the only material passed into the separation vessel, means adjusted to withdraw, from the separation vessel, a concentrated mixture of solid olefine polymer and the liquid olefine monomeric phase, said concentrated mixture having an increased content of solid olefine polymer compared to the liquid phase introduced into the separation vessel, means for passing the concentrated mixture to the second polymerisation vessel and means adjusted to maintain the second polymerisation vessel under conditions of temperature and pressure such that the olefine monomer forming the liquid olefine monomeric phase in the first polymerisation vessel, is in the gaseous phase.

2. The apparatus of claim 1 wherein the separation vessel is a hydro-cyclone.

3. The apparatus of claim 1 wherein the separation vessel is provided with means adjusted to withdraw a dilute liquid phase and to return this dilute liquid phase directly to the first polymerisation vessel, said dilute liquid phase having a reduced content of solid olefine polymer compared to the liquid phase introduced into the separation vessel.

4. The apparatus of claim 1 which includes a third polymerisation vessel wherein there are provided means for withdrawing, from the second polymerisation vessel, a mixture of a solid olefine polymer and a gaseous olefine monomeric phase and passing this mixture into the third polymerisation vessel, and means for passing into the third polymerisation vessel at least one olefine monomer which is different from the monomer forming the liquid olefine monomeric phase withdrawn from the first polymerisation vessel.

5. The apparatus of claim 1 wherein the second polymerisation vessel, and any polymerisation vessels subsequent to the second polymerisation vessel, are suitable for effecting gas/solid reactions and are selected from fluidised bed reactor systems, stirred bed reactor systems or ribbon blender type reactor systems.

* * * * *